United States Patent Office 3,312,354
Patented Apr. 4, 1967

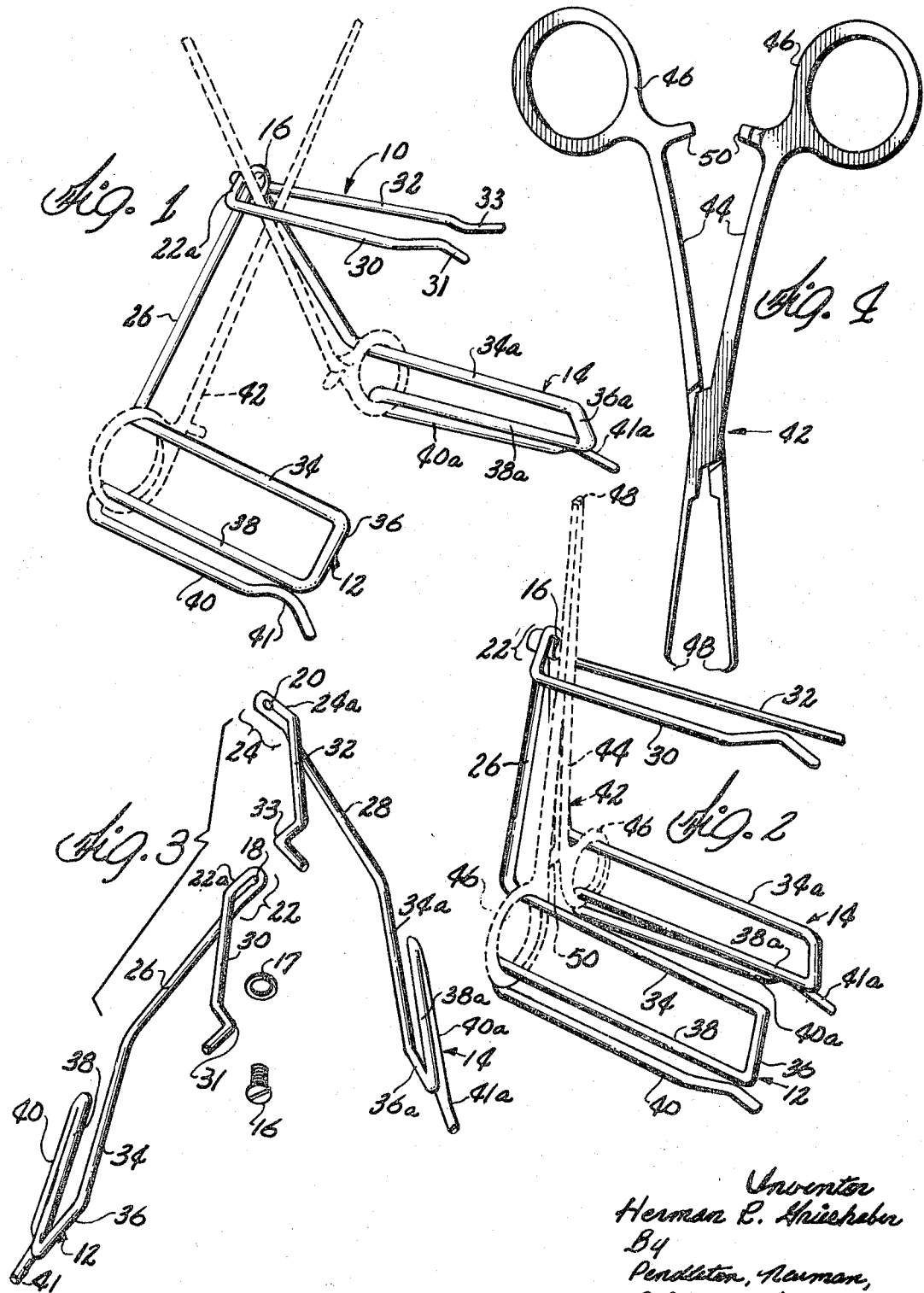

3,312,354
STERILIZING RACK
Herman R. Grieshaber, Kenilworth, Ill.
(7020 W. Cullom Ave., Norridge, Ill. 60634)
Filed Dec. 21, 1964, Ser. No. 419,904
6 Claims. (Cl. 211—59)

This invention relates to a sterilizing rack for forceps, scissors and the like which may be advantageously employed during both the sterilization and the storage of such instruments prior and subsequent to such sterilization.

Surgical instruments of necessity must be sterilized prior to use in an autoclave or other device providing the desired sterilizing atmosphere. In the process of sterilization, it is necessary that all surface portions be contacted with the sterilizing medium. Consequently, a supporting rack must allow forceps, scissors and the like to be maintained in an open, surface-exposing condition during sterilization. A rack which also allows the forceps to be securely maintained in a fixed position relative to the rack, should the rack be tipped, is also most desirable.

It is an object of this invention, therefore, to provide a sterilizing rack for forceps and similar scissors-like instruments which allows such instruments to be securely positioned in an open condition in a sterilizing atmosphere.

It is a further object of this invention to provide a sterilizing rack in which a plurality of scissors-like instruments may be erectly maintained in non-touching, close relationship thereby assuring contact of all surface portions of the instruments with a sterilizing atmosphere, such as steam.

It is a still further object of this invention to provide a sterilizing rack composed of simple, heavy-wire pieces which may be readily formed and assembled into an operative condition from which it may be collapsed into a compact form when not in use.

The above and other objects of this invention will become more apparent from the following detailed description when read in the light of the accompanying drawing and appended claims.

In one embodiment of this invention, a rack composed of pivoting half portions is provided. The half portions are composed of heavy wires which are bent into desired shapes. The halves turn about a pivot screw which also serves as a means for retaining the wire halves together. Each half is composed of a connecting arm having a small U-shaped pivot connection at one end and a large, scissors-engaging, U-shaped portion having diverging arms at the opposed end.

The arms and pivot connections pivot in a plane of movement; the large U-shaped portions adapted to resiliently hold finger-engaging portions of a pair of scissors or the like extend from the connecting arms at substantially right angles to the plane of movement. A scissors-supporting arm having an offset end portion extends from one end of each pivot connection at right angles to the plane of movement. A clip-forming arm, also having an offset end portion, is formed integrally with each arm of the U-shaped, scissors-engaging portions disposed furthest from the pivot point, as will hereinafter be explained in greater detail.

For a more complete understanding of this invention, reference will now be made to the drawing wherein:

FIGURE 1 is a perspective view illustrating one embodiment of the sterilizing rack formed in accordance with this invention, depicting a forceps member thereon in dotted lines;

FIG. 2 is a perspective view illustrating the sterilizing rack of FIG. 1 having a forceps shown in dotted lines mounted thereon in the locked or storage position;

FIG. 3 is an exploded view illustrating the basic components of the sterilizing rack of this invention; and FIG. 4 is a front elevational view of a forceps which may be mounted on the rack of FIGS. 1 through 3 for sterilizing and storage purposes.

Referring now more particularly to FIG. 1, a sterilizing rack 10 is illustrated composed of half portions 12 and 14 which are pivotally connected at 16. It will be more apparent from FIG. 3 that the pivot 16 of the rack 10 comprises a screw member which threadedly engages threaded openings 18 and 20 formed in the rack half portions 12 and 14, respectively.

The half portions 12 and 14 are formed of heavy wires which are bent into the configurations illustrated. It is most apparent from FIG. 3 that the half portions 12 and 14 differ slightly. The U-shaped portions 22 and 24 of the half portions 12 and 14, respectively, in which the threaded openings are formed, are each slightly offset from the longitudinal axis of connecting arm portions 26 and 28, respectively, with which integrally formed, in the direction of the opposing half portion. Because of this latter difference, the half portions are not truly twin portions.

It will be further noted from FIG. 3 that the U-shaped connecting portions 24 and 22 have been flattened so as to provide flattened surfaces disposed at substantially right angles to the longitudinal axes of support arms 30 and 32 of the half portions 12 and 14, respectively. The flat surfaces of the U-shaped portions provide desired planar pivoting surfaces and, in addition, facilitate the formation of the threaded openings 18 and 20 therein.

Connecting arm 26 of half portion 12 is integrally formed at its lower end with arm 34 extending at substantially a right angle to the connecting arm and in substantially parallel relationship with overlying support arm 30. Arm 34, in turn, is formed integrally with a short connecting arm 36 which also is formed integrally with an arm 38, which is substantially parallel to arm 34. A clip arm 40 is integrally formed with the end of arm 38 opposed to the connection with short connecting arm 36, and has an offset end portion 41 which abuts against overlying arm 38 in the manner more clearly seen in FIGS. 1 and 2.

It will be noted that arms 34 and 38 are not parallel, but are slightly divergent in the direction of the connecting arm 26 which pivotally moves with connecting U-shaped portion 22. Arm 26 moves in a plane of movement relative to the opposed half portion 14 of the rack 10 when the two half portions are urged into spaced and adjacent relationships about pivot screw 16. Washer 17 may be employed in conjunction with screw 16 in the course of maintaining the rack half portions in the assembled relationship illustrated in FIGS. 1 and 2.

It is apparent from FIGS. 1 through 3 that rack half portion 14 possesses arm portions 34a, 36a, 38a, 40a and 41a, which correspond precisely with the identically numbered portions in rack half portion 12 not bearing the adscription a.

It is intended that the rack 10 of FIG. 1 composed of the elements more clearly shown in FIG. 3 be adapted to maintain in an erect position, scissors-like elements, such as forceps 42 illustrated in FIG. 4. The forceps 42 is composed of opposed tong portions 44, each of which has a lower annular finger-engaging portion 46 and an upper, toothed end portion 48. The forceps-tong portions pivotally move about an internal central pivot point, not shown, and possess locking teeth 50, which project from the annular finger-engaging portions 46. When the finger-engaging portions 46 are urged together in the manner illustrated in FIG. 2, the opposed teeth 50 engage in mutual locking relationship, maintaining the illustrated forceps in a rigid one-piece condition.

In the normal course of use, the annular finger-engaging portions of a scissors-like member, such as forceps 42, are slid over divergent arms 34–38 and 34a–38a of the rack half portions 12 and 14, respectively. Because of the divergence between the latter pairs of arms, there will be a snug engagement between the arms and opposed inner annular portions of the rings 46 of forceps 42 so as to retain the forceps in an erect vertical position in the manner illustrated in FIG. 2.

If the opposed rack half portions are arranged in adjacent relationship in the manner illustrated in FIG. 2, in the course of mounting the forceps or other scissors-like members thereon, the upper forceps portions will readily pass through the interval between the overlying support arms 30 and 32. If the forceps are to be stored prior to sterilization, it is apparent from FIG. 2 that a number of forceps may be mounted upon the rack in the manner illustrated and the locking teeth 50 urged into locking engagement so that a rigid, compact assembly of forceps and rack results. In the latter position the rack half portions will not move apart because of the locked condition of the forceps in which the forceps are rigidly maintained erect relative to the rack because of the diversity of the rack arms engaging the annular portions 46.

When it is desirable to sterilize the forceps or other scissors-like instrument prior to use, the assembly of FIG. 2 is merely opened to the position illustrated in FIG. 1 by disengaging the locking teeth of the forceps from each other and spreading the sterilizing rack half portions 12 and 14 apart about screw 16 until the opposed tong portions 44 of the forceps engage upper support arms 30 and 32. In the position of FIG. 1, substantially all surface area portions of the forceps 42 are exposed to any sterilizing atmosphere to which the illustrated assemblage may be exposed. The only engagement between the forceps and the rack portions supporting the same are point contacts between various forceps portions and surface-supporting portions of the rack engaging opposed portions of the finger rings 46 of the forceps and opposed outer surface portions of the tongs 44.

Clip arms 40 and 40a of the rack 10 prevent the forceps from accidentally becoming disengaged from the supporting rack as they approach the narrow end or bight end of the U-shaped portions defined by arms 38, 34 and 36 and the corresponding parts on the opposed rack portion bearing the adscription a. In order for a forceps to become disengaged from the rack U-shaped portions, the finger-engaging portions 46 in the forceps must be urged through the interface between the offset portions 41 and 41a of the clip arms 40 and 40a, respectively, defined with adjacent arms 38 and 38a.

Similarly, it is impossible for a forceps member to have the upper portion fall free from engagement with upper support arms 30 and 32 since offset end portions 31 and 33 of arms 30 and 32, respectively, define a restricted neck which prevents disengagement of the upper forceps portions from the support arms 30 and 32, even should the forceps be forcibly tilted away from screw 16.

It is apparent, therefore, that a sterilizing rack of simple construction has been provided which may be employed not only for purposes of storing scissors-like instruments in a rigid compact condition, but in addition, the above-described rack may be employed as a sterilizing rack in which the instruments disposed thereon are rigidly locked in place in a desirably secure condition which is free from tilting.

In the open or sterilizing position, provided rack 10 maintains all of the scissors-like instruments mounted thereon in a firm, supported condition in which only point contacts are effected between the instruments and the supporting rack. Because of the rigidity with which the instruments are maintained on the sterilizing rack, a plurality of instruments closely spaced, but in non-contacting relationship, may be maintained on the rack whereby substantially all of the surface areas of the various instruments may be exposed to the sterilizing atmosphere.

It is apparent from FIGS. 1 through 3 that the interval between the support arms 30 and 32 and the resultant angular disposition between the tong portions 44 and forceps 42 may be governed by the length of arm portions 22a and 24a of the flattened U-shaped connecting portions 22 and 24, respectively.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A rack comprising cooperating half portions pivotally engageable and movable into adjacent and spaced relationships; each of said cooperating portions having a connecting portion, the connecting portions being pivotally engageable and movable about a pivot point in a plane of movement; substantially U-shaped portions connected with an end portion of each of said connecting portions oppositely disposed to the point of pivotal engagement, said U-shaped portions being substantially normally disposed to the plane of movement; opposed arms of said U-shaped portions being slightly divergent in the direction of said plane of movement and connected by a bight portion, and arm means contiguous with one arm of each of said U-shaped portions extending away from said plane of movement and touching said one arm adjacent the bight of said U-shaped portion.

2. A rack comprising opposed half portions pivotally movable relative to each other, each of said half portions having a connecting arm pivotally engageable in a pivot plane at one end portion with the arm of the opposed half portion; the end portion of each of said connecting arms opposed to the pivotally engageable end portion being formed integrally with a substantially U-shaped portion; the open end of said U-shaped portion being disposed toward said pivot plane; the opposed arms of said U-shaped portion diverging slightly in the direction of said pivot plane.

3. A rack for stacking forceps and the like having pivotally engageable tong portions with annular finger-engaging portions defining one end limit thereof, said rack comprising pivotally movable stacking halves adapted to move into adjacent and spaced relationships, each of said stacking halves having connector portions pivotally movable in a plane of movement about a pivot point, means for resiliently engaging opposed peripheral portions of the annular finger-engaging portions of said tongs, connected to each of said connector portions and extending at right angles to said plane of movement; clip means integrally formed with one end portion of the resiliently-engaging means for retaining finger-engaging portions of said forceps to said resiliently-engaging means, tong-supporting arms extending at substantially right angles to said plane of movement; each of said connector portions having a continuation arm defining a U-shaped reverse bend with the end portion of each of said connector arms adjacent said pivot point; each of said tong-supporting arms extending from one end of each of said continuation arms at a point adjacent the point of pivotal engagement of said connector portions.

4. The rack of claim 3 in which said tong-supporting arms have offset portions disposed adjacent the distal ends thereof, offset in the direction of the opposed arm so as to define a constricted neck portion.

5. A rack comprising opposed continuous half portions movable into spaced and adjacent relationships, each half portion comprising a connector arm having a U-shaped pivot portion contiguous with one end portion thereof, means securing said U-shaped portions together, said connector arms being pivotally movable about the securing means in a plane of movement, arm means connected to a second end portion of each of said U-shaped pivot portions; said arm means extending at substantially right angles to said plane of movement, each of said rack half portions having a second U-shaped portion of spaced arm portions connected by a bight portion; a first spaced arm portion of each of said second U-shaped portions being connected to a second end portion of each of said connector arms, said second U-shaped portions extending at substantially right angles to the plane of movement; said spaced arm portions of each second U-shaped portion being slightly divergent in the direction of said plane of movement; and a clip arm connected to a second arm portion of each of said second U-shaped portions extending along the length of each of said second arm portions and having an offset end portion contacting said second arm portions in the vicinity of said second U-shaped bight portion connecting the arm portions thereof.

6. The rack of claim 5 in which each of said rack half portions comprise an integral unitary member formed from a single piece of heavy wire.

References Cited by the Examiner

UNITED STATES PATENTS 2,906,410    9/1959    McGuire _____ 211—59

CLAUDE A. LE ROY, *Primary Examiner.*

W. D. LOULAN, *Assistant Examiner.*